Nov. 13, 1962 — E. J. W. GEHRKE — 3,063,361
MOBILE PELLETIZING APPARATUS
Filed Dec. 2, 1959 — 2 Sheets-Sheet 1

Emil J. W. Gehrke
INVENTOR.

Nov. 13, 1962   E. J. W. GEHRKE   3,063,361
MOBILE PELLETIZING APPARATUS
Filed Dec. 2, 1959   2 Sheets-Sheet 2

Emil J. W. Gehrke
INVENTOR.

United States Patent Office 3,063,361
Patented Nov. 13, 1962

3,063,361
MOBILE PELLETIZING APPARATUS
Emil J. W. Gehrke, Rte. 2, Willow Lake, S. Dak.
Filed Dec. 2, 1959, Ser. No. 856,810
8 Claims. (Cl. 100—98)

This invention relates generally to agricultural equipment and more particularly to a device for compressing and pelletizing agricultural vegetation.

It has been found that if agricultural products, as hay or such, are reduced to pellets, they may be more usefully employed. For example, by reducing hay to pellets, the hay is easier to handle and will serve as feed for cattle. Many other uses of vegetation pellets will readily come to mind but it is not thought that each of the various contemplated uses need be here enumerated. Aside from pelletizing agricultural vegetation, the pelletizing apparatus below disclosed may be utilized to reduce lignite coal, peat, muskeg and fertilizer, etc. into pellets.

In view of the apparent usefulness of pelletizing apparatus for various purposes, it is the principal object of this invention to provide a novel pelletizing device, which may be utilized as a portion of either stationary or mobile equipment to effectively reduce various substances into pellets, even with those having moisture contents up to 30%.

It is a further object of this invention to present novel improvements in pelletizing apparatus which initially includes compressing the products and then cutting them and immediately thereafter forcing them through perforations formed in a perforated plate. It is contemplated that the apparatus includes conveyor means for carrying the products to the device and for carrying the pellets therefrom.

It is a still further object of this invention to provide novel pelletizing apparatus which operates efficiently to form pellets of any of a multiplicity of substances. As noted, the apparatus may be used in either a stationary or mobile installation, either of which may be inexpensively established and maintained.

It is further contemplated that cooked or processed meats may be pelletized making possible the preservation of such goods for storage in a compressed form. Also, binders may be utilized in conjunction with some materials, as for instance, sawdust, for enabling products of this type to be pelletized.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a fragmentary section view taken substantially along the plane 4—4 of FIGURE 3;

FIGURE 5 is a fragmentary view of a second embodiment of the invention illustrating how the housing and auger may be tapered; and FIGURE 6 is a fragmentary view of a third embodiment of the invention illustrating how a spiral flange may be formed on the inner surface of the housing for cooperation with the auger flange.

Figure 1:
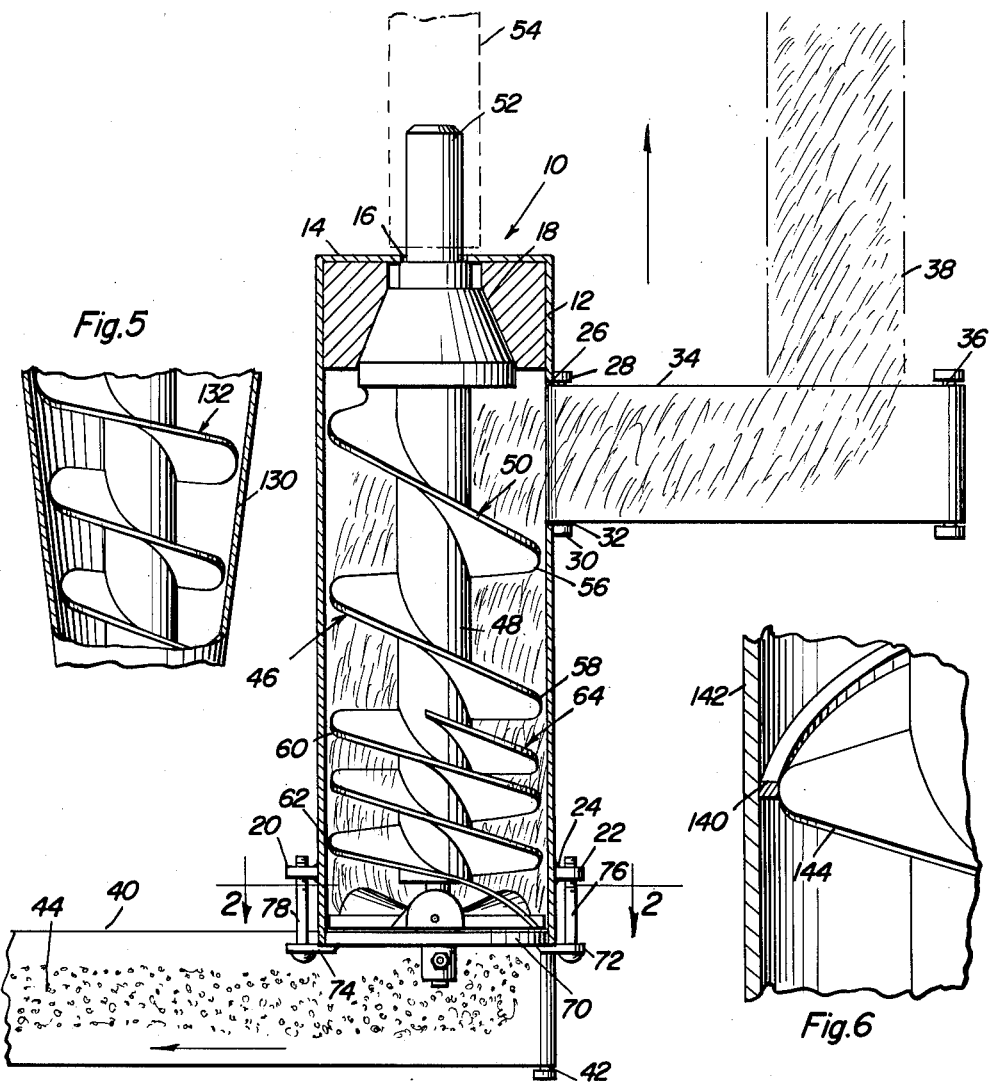
FIGURE 1 illustrates a sectional view of the pelletizing housing illustrating in elevation the internal arrangement utilized and showing how conveyor belts or such may be operated in conjunction with the pelletizing apparatus.

With continuing reference to the drawings, attention is particularly called to FIGURES 1–4 wherein numeral 10 generally represents the pelletizing apparatus forming the invention of this application. The pelletizing apparatus 10 includes a housing 12 which is of cylindrical shape having a substantially circular top 14 defining a central opening 16 therein. A heavy duty thrust bearing 18 is provided below the top 14 for purposes to be more particularly pointed out below. The lower end surface of the housing 12 is open. Internally threaded apertured lugs 20 and 22 are welded to the housing 12 at 24. A housing entrance is provided at 26 with bearings 28 and 30 secured to the housing 12 on each side of the housing entrance 26.

A spindle 32 is rotatably journaled in the bearings 28 and 30 and a conveyor belt 34 is drawn therearound. A drive spindle 36 is representatively illustrated for driving the conveyor belt 34 to carry agricultural products or such 38 into the housing 12. Likewise, a second conveyor belt 40 is provided extending about spindle 42 for carrying pellets 44 from the apparatus 10.

A material conveying and compacting auger generally designated as 46 is provided with a central auger shaft 48 and a main continuous spiral flange 50. The shaft 48 has a reduced end 52 extending through the thrust bearing 18 and rotatably driven by a drive shaft 54 connected to a power take-off of a tractor for example. The main continuous spiral flange 50 defines a spacing between the adjacent flanges which decreases toward the lower end of the housing 12 for material compaction purposes. For example, it is to be noted that the spacing between flanges 56 and 58 of the continuous spiral flange 50 is greater than the spacing between the flanges 60 and 62. An auxiliary spiral flange 64 is provided at the lower end of the auger, starting, for example, between flanges 58 and 60 and extending downwardly between flanges 60 and 62. By spacing the flanges more closely toward the lower end of the housing 12, agricultural products 38 being fed by the belt 34 into the housing 12 through the entrance 26, will be progressively compressed as they are driven downwardly by the rotating auger with greater facility. It is further to be noted that the auger flanges have small clearance with respect to the housing wall so that the products 38 are forcefully carried downwardly and compressed as the spacing between adjacent flanges is reduced. Preferably, the auger flanges should be made of fine tool steel so that as the material moves forward through the auger unit, there will be a cutting action upon long coarse material which may be longer than the initial distance between the first and second or subsequent auger flanges. It is also contemplated that the auger flanges be made removable if desired.

A perforated extrusion die plate 70 having projecting ears 72 and 74 is provided, sealing the bottom of the housing 12. Bolts 76 and 78 are extended through the ears 72 and 74 and lugs 22 and 20, respectively, to secure the plate 70 to the housing 12. The plate 70 is perforated extensively with the perforations being designated by the numerals 80. It is to be particularly noted in FIGURES 3 and 4 that the perforations 80 are conically formed in part as at 82 for allowing for further compression of products to be forced therethrough.

A cutting member 84 is provided and includes a plurality of blades 86, 88 and 90. The blades 86, 88 and 90 project radially from a hub 92 provided with a triangular recess 94. The auger shaft 48 is provided with a reduced portion triangular in cross-section which is received in the recess 94, the reduced portion being designated by the numeral 96. It should of course be understood that the cross-sectional shape of the recess 94 and reduced portion 96 must be such as to make the hub 92 and shaft 48 rotatively fast. Accordingly, the recess and reduced portion may also be squared if so desired. The hub 92 has a round spindle 98 secured to the bottom thereof which is rotatable in an opening 100 formed in a depending boss 102 formed as part of the perforated plate 70. It will therefore be appreciated that as the drive shaft 54 rotates the auger shaft 48, the auger shaft 48 will in turn rotate the cutting member 84 as the reduced portion 96 of the auger shaft 48 received in the triangular recess 94 rotates the hub 92.

Figure 2:
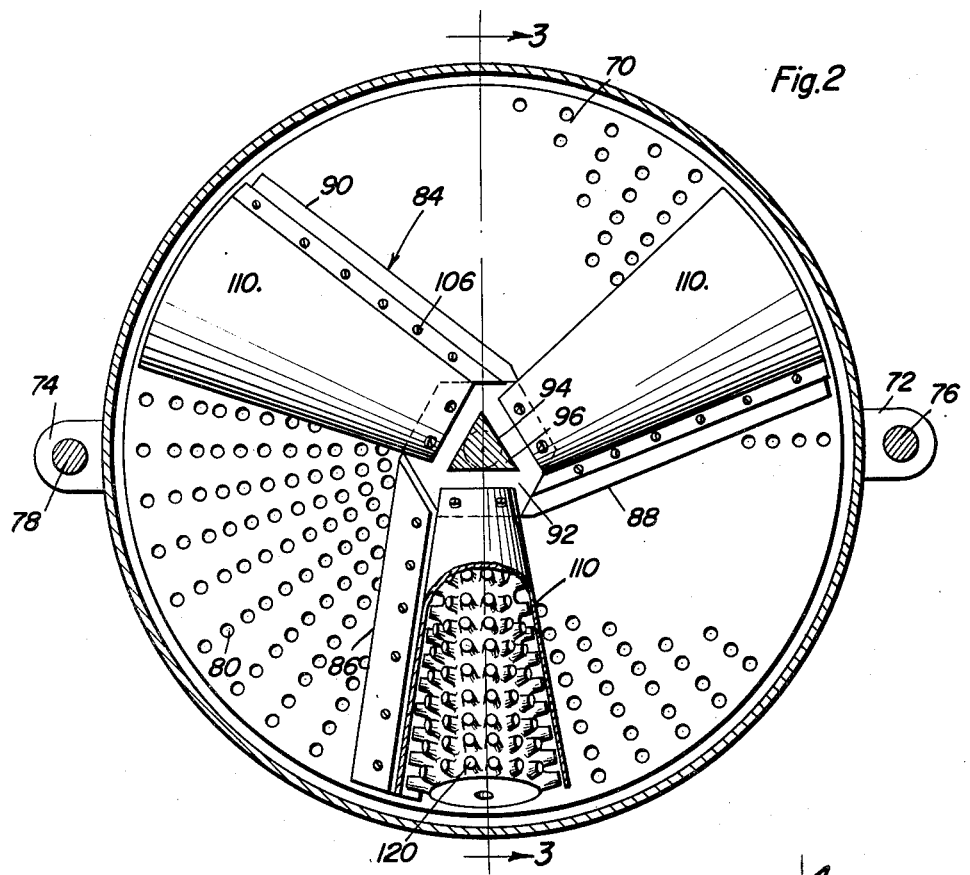
FIGURE 2 is an enlarged sectional view taken substantially along the plane 2—2 of FIGURE 1.
Figure 3:
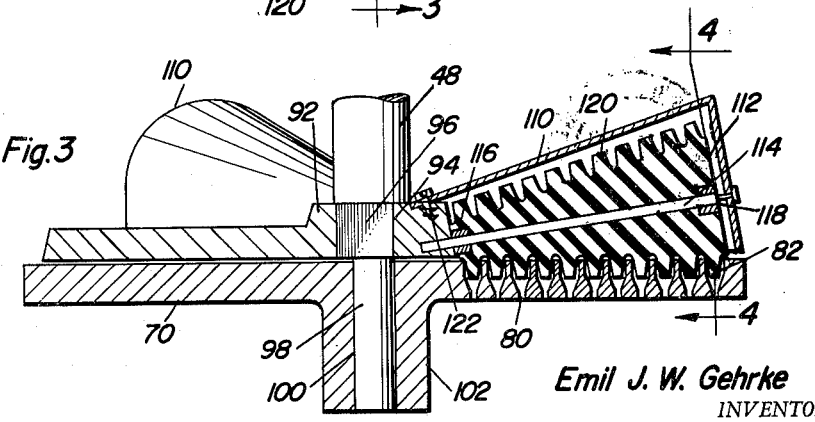
FIGURE 3 is a sectional view taken substantially along the plane 3—3 of FIGURE 2.

The blades 86, 88 and 90 are secured to radially extending arms 104 by screws 106. Interposed between the screw head 106 and the blade is a forwardly projecting portion 108 of an arcuate guard 110. The guard 110 extends over and encloses a conical roller 112 thereby mounted on the same side of the die plate as the cutter for rotation about shaft 114 secured between hub 92 and guard 110 as is particularly illustrated in FIGURE 3. Bearings 116 and 118 allow the roller 112 to rotate about the shaft 114. As illustrated in FIGURES 2 through 4, the outer surfaces of the rollers 112 are provided with projections 120. A roller 112 is rotatably mounted behind each of the blades 86, 88 and 90. The projections 120, as is well shown in FIGURES 3 and 4, are receivable in the perforations 80 of plate 70. Screws 122 are also utilized to secure the guard 110 to the hub 92.

It is thought that the operation of the embodiment illustrated in FIGURES 1 through 4 should now be well understood. The conveyor belt 34 is utilized to carry the products 38 into the housing 12 through entrance 26. As the auger rotates, the products are carried therealong with the products being compressed by the auger flanges as noted hereinbefore. Inasmuch as the cutting member 84 is rotating along with the auger, the blades 86, 88 and 90 cut the compressed products immediately above the perforated plate 70. The rotatably mounted roller 112 carried immediately behind each of the blades then forces the compressed and cut product through the perforations 80 in the plate 70. The conical shape illustrated as at 82 of the perforations 80 allows for the products to be additionally compressed. It is apparent that therefore pellets will be formed which will be compressed sufficiently to stick together for ease in handling but which will not be compressed to the extent that they are too hard for cattle to eat. The belt 40 is then provided for carrying the pellets 44 from the apparatus 10.

The second embodiment of the invention particularly illustrated in FIGURE 5 contemplates further means for compressing the products before reaching the plate 70. This embodiment includes utilization of a conical housing 130 and a conical auger generally designated as 132. It is, of course, also contemplated that the spacing of the flanges on the auger 132 be reduced toward the lower end of the housing 130 as particularly described in conjunction with FIGURES 1–4.

The additional embodiment illustrated in FIGURE 6 suggests utilization of a spiral cutter flange 140 on the inner wall of a housing 142. The spiral cutter flange 140 cooperates with the auger flange 144 so as to still more efficiently compress the products and cut them as they proceed through the housing 142. It should also be appreciated that the spiral flange on the inside of the housing 142 may be utilized in conjunction with the embodiment of the invention illustrated in FIGURES 1–4 and the embodiment illustrated in FIGURE 5.

In lieu of the precise construction illustrated in the drawings, it is contemplated that the plate 70 be adjustably mounted for movement toward and away from the cutting member to allow the clearance therebetween to be varied. Also, it is to be appreciated that the perforations 80 in a particular plate 70 may be of any size desired with the plates being interchangeable on the housing 12.

If found to be necessary, a slip-clutch may be provided at the upper end of the auger shaft to protect the mechanism in case of clogging and to allow reversal of the auger rotation to enable the entire mechanism to be cleared. By properly designing the auger, it will act as a flywheel to assure smooth and even operation.

It is thought that the foregoing will convey to one skilled in the art the appropriate suggestions for fully understanding the invention wherein improved means for compressing, cutting and pelletizing products have been disclosed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A device for compressing agricultural products or the like and forming said products into pellets comprising a housing, said housing defining a feed opening, auger means rotatably supported in said housing for compressing material entering the feed opening toward a delivery end of the housing, drive means operatively connected to said auger means for rotating said auger means, a perforated plate closing said delivery end of the housing, and pelletizing means operatively connected to the auger means and drivingly engageable with the perforated plate to sequentially cut material under pressure from the auger means and positively force cut material through said perforated plate, to form pellets therefrom of predetermined size and shape, said pelletizing means comprising conical roller means rotatably mounted on the auger means at the delivery end of the housing, casing means mounted on the auger means enclosing said roller means, projections on the roller means drivingly engageable with said plate for rotation of the roller means in response to rotation of the auger means, and cutter means mounted on the casing means forwardly of the roller means.

2. The combination of claim 1, wherein said auger means includes a plurality of flanges, said flanges being spaced more closely to adjacent flanges toward said delivery end of the housing whereby said material is compressed as it is driven toward said delivery housing end.

3. The combination of claim 1, wherein said auger means includes a plurality of flanges, said flanges being spaced more closely to adjacent flanges toward said delivery housing end whereby said material is compressed as it is driven toward said delivery housing end, spiral flanges formed on the inner surface of said housing, said auger flanges cooperating with said spiral flanges for driving said material through said housing.

4. A pelletizing device comprising a housing, a perforated plate secured to and closing one end of said housing, means associated with said housing for conveying material toward and compacting it into the openings in said perforated plate, a cutter secured to the inside of said housing and positioned adjacent to the inner face of said perforated plate, means secured to said cutter and said perforated plate for producing relative movement between them whereby material partially in the perforations of said perforated plate is sheared off at the plate face, a guard mounted in said housing adjacent to said cutter, and means movably mounted under said guard and including projections that alternately enter and withdraw from the openings of said perforated plate for forcing material down into said openings and out at the far side of said perforated plate.

5. The pelletizing device of claim 4 in which said movable means constitutes a roller rotatably mounted under said guard and having projections on the face thereof that mesh with and enter the openings in said perforated plate whereby relative movement between said plate and said cutter produces a rolling action of said roller with said projections entering and leaving the openings in said perforated plate like the teeth of gears.

6. The pelletizing device of claim 5 in which the openings in said perforated plate reduce in size from the side on which said cutter is mounted to the opposite face thereof.

7. The pelletizing device of claim 4 in which the openings in said perforated plate reduce in size from the side on which said cutter is mounted to the opposite face thereof.

8. A device for compressing agricultural products or the like and forming said products into pellets comprising a housing, said housing defining a feed opening, auger means rotatably supported in said housing for compressing material entering the feed opening toward a delivery end of the housing, drive means operatively connected to said auger means for rotating said auger means, a perforated plate closing said delivery end of the housing, and pelletizing means operatively connected to the auger means and drivingly engageable with the perforated plate to sequentially cut material under pressure from the auger means and positively force cut material through said perforated plate, to form pellets therefrom of predetermined size and shape, said auger means including a plurality of flanges, said flanges being spaced more closely to adjacent flanges toward said delivery end of the housing whereby said material is compressed as it is driven toward said delivery housing end, said pelletizing means including cutting blades carried by said auger means for rotation therewith, said cutting blades being mounted on said auger means parallel to said perforated plate and between said auger flanges and said plate and said pelletizing means also including rotationally mounted rollers carried behind each of said cutter blades in engagement with said perforated plate on the same side thereof as the cutter blades for pressing said material through perforations in said plate, said rollers including surfaces provided with a plurality of projections extending outwardly therefrom, said projections being receivable in said perforations.

References Cited in the file of this patent

UNITED STATES PATENTS

| | | |
|---|---|---|
| 332,718 | Lafferty | Dec. 22, 1885 |
| 1,238,981 | Barton | Sept. 4, 1917 |
| 2,012,908 | Field | Aug. 27, 1935 |
| 2,013,009 | Satzinger | Sept. 3, 1935 |
| 2,063,404 | Selman | Dec. 8, 1936 |
| 2,124,744 | Meakin | July 26, 1938 |
| 2,386,052 | Lundy | Oct. 2, 1945 |
| 2,583,600 | Schreiber | Jan. 29, 1952 |
| 2,958,099 | Chisholm et al. | Nov. 1, 1960 |